(12) United States Patent
Peng et al.

(10) Patent No.: US 12,098,096 B2
(45) Date of Patent: Sep. 24, 2024

(54) UNITED STATES LOW DIELECTRIC SEALING GLASS POWDER FOR MINIATURE RADIO-FREQUENCY GLASS INSULATOR

(71) Applicant: CNBM RESEARCH INSTITUTE FOR ADVANCED GLASS MATERIALS GROUP CO., LTD, Bengbu (CN)

(72) Inventors: Shou Peng, Bengbu (CN); Chong Zhang, Bengbu (CN); Weiwei Wang, Bengbu (CN); Changqing Li, Bengbu (CN); Jinwei Li, Bengbu (CN); Xiaofei Yang, Bengbu (CN); Gang Zhou, Bengbu (CN); Zhenkun Ke, Bengbu (CN); Xin Cao, Bengbu (CN); Chuanli Shan, Bengbu (CN); Jia Ni, Bengbu (CN); Jiedong Cui, Bengbu (CN); Fengyang Zhao, Bengbu (CN); Zhaojin Zhong, Bengbu (CN); Pingping Wang, Bengbu (CN); Qiang Gao, Bengbu (CN); Na Han, Bengbu (CN); Lifen Shi, Bengbu (CN); Yong Yang, Bengbu (CN)

(73) Assignee: CNBM RESEARCH INSTITUTE FOR ADVANCED GLASS MATERIALS GROUP CO., LTD., Bengbu (CN)

(*) Notice: Subject to any disclaimer, the term of this patent is extended or adjusted under 35 U.S.C. 154(b) by 0 days.

(21) Appl. No.: 18/266,273

(22) PCT Filed: Apr. 24, 2022

(86) PCT No.: PCT/CN2022/088738
§ 371 (c)(1),
(2) Date: Jun. 9, 2023

(87) PCT Pub. No.: WO2022/228340
PCT Pub. Date: Nov. 3, 2022

(65) Prior Publication Data
US 2024/0059605 A1    Feb. 22, 2024

(30) Foreign Application Priority Data

Apr. 25, 2021    (CN) .................. 202110446122.3

(51) Int. Cl.
    *C03C 8/08*        (2006.01)
    *C03C 3/11*        (2006.01)
    *C03C 8/24*        (2006.01)

(52) U.S. Cl.
CPC .................. *C03C 8/08* (2013.01); *C03C 3/11* (2013.01); *C03C 8/24* (2013.01); *C03C 2205/00* (2013.01)

(58) Field of Classification Search
CPC .... C03C 8/08; C03C 3/11; C03C 8/24; C03C 2205/00
See application file for complete search history.

(56) References Cited

U.S. PATENT DOCUMENTS

| | | | | |
|---|---|---|---|---|
| 5,196,915 A | * | 3/1993 | Ito .......................... | H01B 1/06 257/536 |
| 2020/0407266 A1 | * | 12/2020 | Suzuki .................... | C03B 23/03 |
| 2023/0174409 A1 | * | 6/2023 | Mao .......................... | C03C 4/20 501/63 |

FOREIGN PATENT DOCUMENTS

| CN | 112456795 A | 3/2021 |
|---|---|---|
| CN | 113121119 A | 7/2021 |

(Continued)

OTHER PUBLICATIONS

"Lanthanum Hexaboride"—Wikipedia—https://en.wikipedia.org/wiki/Lanthanum_hexaboride (accessed May 9, 2024) (Year: 2024).*

(Continued)

*Primary Examiner* — Bryan D. Ripa
*Assistant Examiner* — Cameron K Miller
(74) *Attorney, Agent, or Firm* — IPRTOP LLC

(57) ABSTRACT

A low dielectric sealing glass powder for a miniature radio-frequency glass insulator is made of the following raw materials expressed in molar percentages: $SiO_2$: 70.5-74.0%, $B_2O_3$: 20.5-23.5%, $Ga_2O_3$: 0.5-2.0%, $P_2O_5$: 0.25-2.0%, $Li_2O$: 0.4-6.0%, $K_2O$: 0.1-1.5%, $LaB_6$: 0.05-1.0%, and NaCl: 0.03-0.3%. The raw material components are simple, and the preparation method is easy to implement.

(Continued)

The dielectric constant and dielectric loss of the prepared glass powder are low, and the melting and molding temperature is low, which are convenient for large-scale industrial production. The melting and molding temperature of the low dielectric sealing glass powder ranges from 1320° C. to 1360° C., and the obtained glass has a dielectric constant ranging from 3.8 to 4.1 and a dielectric loss ranging from $4 \times 10^{-4}$ to $10 \times 10^{-4}$ at a frequency of 1 MHz, and a sealing temperature ranging from 900° C. to 950° C.

12 Claims, 4 Drawing Sheets

(56) References Cited

FOREIGN PATENT DOCUMENTS

| | | |
|---|---|---|
| EP | 0016498 A1 | 10/1980 |
| JP | 2004269269 A | 9/2004 |
| JP | 2021024775 A | 2/2021 |

OTHER PUBLICATIONS

"Borosilicate Glass"—Wikipedia—https://en.wikipedia.org/wiki/Borosilicate_glass (accessed May 9, 2024) (Year: 2024).*

* cited by examiner

UNITED STATES LOW DIELECTRIC SEALING GLASS POWDER FOR MINIATURE RADIO-FREQUENCY GLASS INSULATOR

TECHNICAL FIELD

The present disclosure relates to the field of electronic glass, in particular, to a low dielectric sealing glass powder for a miniature radio-frequency glass insulator.

BACKGROUND

With the rapid development of information transmission and high-frequency communication technology, electronic devices require higher dielectric properties for sealing glass powder. The smaller the dielectric constant of the material, the faster the propagation rate of the signal, the smaller the dielectric loss of the material, and the smaller the propagation loss at a fixed propagation frequency. Therefore, the sealing glass powder needs to have low dielectric constant and dielectric loss.

In recent years, the operating frequency range of radio-frequency connectors and microwave devices has been greatly increased. In order to reduce the resulting impedance delay and power loss, low-resistivity metals have been used, moreover, the parasitic capacitance of dielectric layers should be reduced. Capacitance C is proportional to dielectric constant s, therefore, low dielectric constant materials can be used as interconnection medium to reduce impedance delay and meet the needs of integrated circuit development. Low dielectric glass powder is an ideal material to be used as the interconnection medium. The low dielectric glass powder has low dielectric constant and dielectric loss which are basically unchanged with the test temperature and frequency, therefore, the low dielectric glass powder plays a role in electronic packaging such as protecting circuits, isolating insulation, and preventing signal distortion. Sealing glass powder with a low dielectric constant used under high-frequency microwave conditions is mainly used for the input and output of microwave signals and control signals of modules and components, which can reduce signal relaxation and cross-interference as well as reduce excessive heat consumption at high frequencies and large resistivity.

However, there are few manufacturers that can provide low dielectric sealing glass powder at present because of the following main problems: (1) the melting temperature of glass powder is too high, and the viscosity is high at high temperature, resulting in high sealing temperature; (2) the dielectric constant or dielectric loss of glass powder is too large, which affects the practical application of the sealing glass powder.

SUMMARY

The present disclosure provides a low dielectric sealing glass powder for a miniature radio-frequency glass insulator. The glass powder has low dielectric constant and dielectric loss, and low melting and forming temperature, thereby meeting the sealing requirements of miniature radio-frequency glass insulators.

The present disclosure adopts the following technical solutions:

A low dielectric sealing glass powder for a miniature radio-frequency glass insulator is provided. The low dielectric sealing glass powder is made of the following raw materials expressed in molar percentages: $SiO_2$: 70.5-74.0%, $B_2O_3$: 20.5-23.5%, $Ga_2O_3$: 0.5-2.0%, $P_2O_5$: 0.25-2.0%, $Li_2O$: 0.4-6.0%, $K_2O$: 0.1-1.5%, $LaB_6$: 0.05-1.0%, and NaCl: 0.03-0.3%.

Further, the low dielectric sealing glass powder is made of the following raw materials expressed in molar percentages: $SiO_2$: 71.5-73.0%, $B_2O_3$: 21.5-23%, $Ga_2O_3$: 0.8-1.5%, $P_2O_5$: 0.5-1.5%, $Li_2O$: 0.8-5.5%, $K_2O$: 0.3-1.2%, $LaB_6$: 0.1-0.8%, and NaCl: 0.1-0.25%.

Further, the low dielectric sealing glass powder is made of the following raw materials expressed in molar percentages: $SiO_2$: 71.5-72.5%, $B_2O_3$: 22-23%, $Ga_2O_3$: 1-1.2%, $P_2O_5$: 0.8-1.2%, $Li_2O$: 1.5-2.5%, $K_2O$: 0.5-1.0%, $LaB_6$: 0.2-0.7%, and NaCl: 0.15-0.2%.

Further, in the low dielectric sealing glass powder for the miniature radio-frequency glass insulator, a ratio of $Li_2O$ to $K_2O$ ranges from 1 to 6.

Further, in the low dielectric sealing glass powder for the miniature radio-frequency glass insulator, a ratio of $Li_2O$ to $K_2O$ ranges from 1 to 3.

The effect of each raw material in the formula, the selection reason of the content of each raw material, and the technical principle of the present disclosure are based on the following:

The dielectric properties are related to the ionic polarizability, and the ionic polarizability is mainly affected by the network structure of glass. As the degree of aggregation of the network structure increases, the resistance of the network structure for charge movement increases and the polarization decreases, thus improving the dielectric properties. As the degree of aggregation of the network structure decreases, the charge movement leads to increased polarization, thereby deteriorating the dielectric properties.

$SiO_2$ is a precursor for forming the glass network, and an increase in the content of $SiO_2$ is conducive to reducing the dielectric constant of the glass, but if the content of $SiO_2$ is too high, the viscosity of the glass liquid will increase rapidly and then it will be difficult to melt. The suitable content of $SiO_2$ in the present disclosure ranges from 70.5% to 74.0%.

$B_2O_3$ acts as a network intermediate and has a low ionic polarizability. By properly increasing the content of $B_2O_3$, the dielectric properties of the glass can be improved. At the same time, $B_2O_3$ is a good flux agent and can effectively reduce the viscosity of the glass at high temperatures. However, if the $B_2O_3$ content is too high, it will directly lead to problems such as the reduction of the mechanical properties of the glass powder and the deterioration of water resistance. The suitable content of $B_2O_3$ in the present disclosure ranges from 20.5% to 23.5%.

$Ga_2O_3$ acts as an intermediate oxide in the network structure of the low dielectric glass. When the content of $Ga_2O_3$ is appropriate, it can reconnect the broken chemical bonds in the glass network structure and play a role in repairing the network body, thereby improving the mechanical strength and the stability of the low dielectric glass. And $Ga_2O_3$ has a large ionic radius, which makes the network structure of the glass denser and thus inhibits the movement of alkali metal ions, which is beneficial to reduce the dielectric constant of the glass. However, if the content of $Ga_2O_3$ is too high, $Ga^{3+}$ will be dissociated outside the network structure, making the dielectric properties of the glass worse. The suitable content of $Ga_2O_3$ in the present disclosure ranges from 0.5% to 2.0%.

$P_2O_5$ is beneficial to reduce the melting temperature of the glass, because the viscous activation energy of the melted $P_2O_5$ is small and is close to the viscous activation energy of $B_2O_3$. Meanwhile, $P_2O_5$ enters the network structure of the
} glass to form [PO$_4$] which includes an oxygen with double bonds, a phosphorus-oxygen tetrahedron with double bonds, and an asymmetric center. [PO$_4$] can reduce the viscosity of the glass, thereby reducing the high-temperature intrinsic viscosity point of the glass, which is beneficial to the control of the float forming process. However, excessive content of P$_2$O$_5$ will lead to poor chemical stability of the glass. The suitable content of P$_2$O$_5$ in the present disclosure ranges from 0.25% to 2.0%.

The present disclosure further introduces lanthanum boride (LaB$_6$), and LaB$_6$ is oxidized at a high temperature during the reaction process to form lanthanum borate. The lanthanum borate acts as a network intermediate, and an addition of appropriate amount of the lanthanum borate has an effect of connecting non-bridging oxygens to repair the network. In the structure of the glass, [BO$_4$], [SiO$_4$] and [BO$_4$] form a tight spatial network, thereby improving the dielectric properties of the glass. In addition, La ions have a large radius, which results in a denser network structure of the glass, thereby inhibiting the movement of alkali metals and alkaline earth metals. Therefore, adding a small amount of LaB$_6$ can improve the dielectric properties of the glass. However, if too much amount of LaB$_6$ is introduced, it will destroy the network structure of the glass and make the dielectric properties of the glass worse. The suitable content of LaB$_6$ in the present disclosure ranges from 0.05% to 1.0%.

Li$_2$O and K$_2$O are also beneficial to the melting of the glass and the transformation to the glass state. Since the radius of Li$_2$O ions is very different from that of K$_2$O alkali metal ions, an appropriate amount of Li$_2$O can form a mixed alkali effect with K$_2$O, which significantly improves the dielectric properties of the glass. In the present disclosure, the suitable content of Li$_2$O ranges from 0.4% to 6.0%, and the suitable content of K$_2$O ranges from 0.1% to 1.5%.

NaCl is introduced as the fining agent of the low dielectric glass powder of the present disclosure to achieve better glass clarification, and the suitable content of NaCl in the present disclosure ranges from 0.03% to 0.3%.

Compared with the traditional technology, the present disclosure has the following advantages:
1. The raw material components are simple, and the preparation method is easy to implement.
2. The dielectric constant and dielectric loss of the prepared glass powder are low, and the melting temperature is low, which are convenient for large-scale industrial production.

The melting and molding temperature of the low dielectric sealing glass powder range from 1320 to 1360° C., and the obtained glass after melting has a dielectric constant ranging from 3.8 to 4.1 and a dielectric loss ranging from $4 \times 10^{-4}$ to $10 \times 10^{-4}$ at a frequency of 1 MHz, and a sealing temperature ranging from 900 to 950° C.

DETAILED DESCRIPTION

Figure 1:
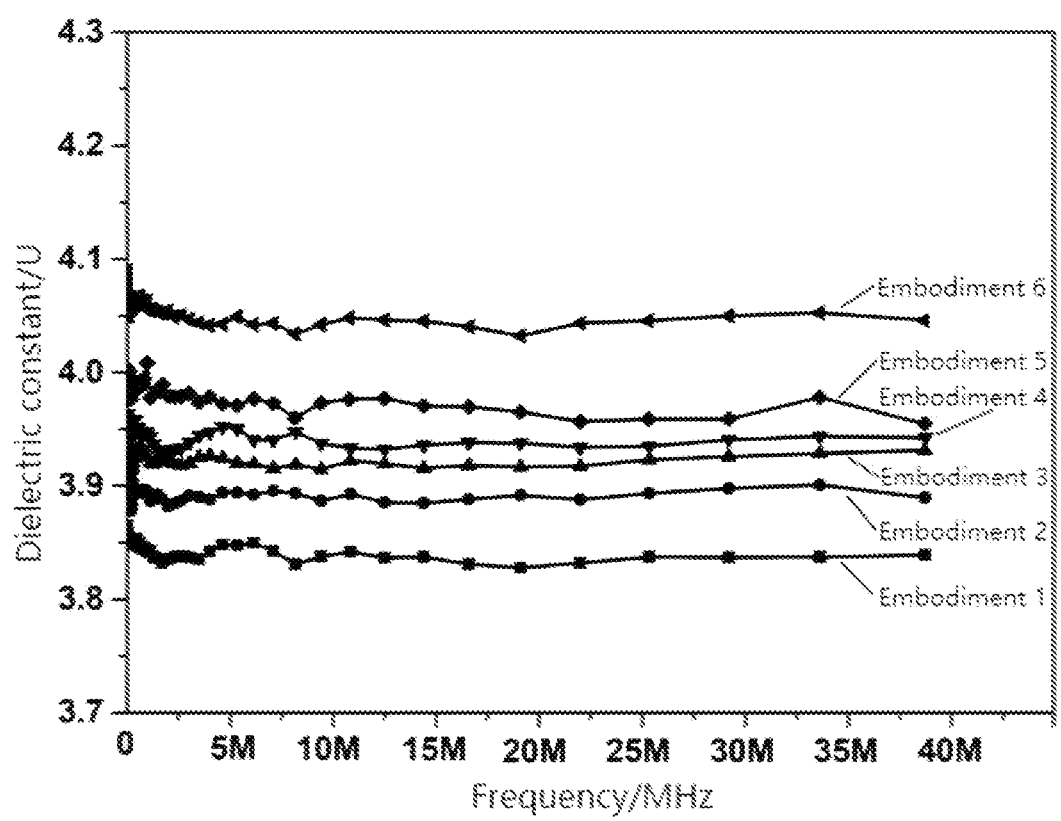
FIG. 1 shows a graph of dielectric constant of a glass powder sample versus tested frequency according to an embodiment of the present disclosure.
Figure 2:
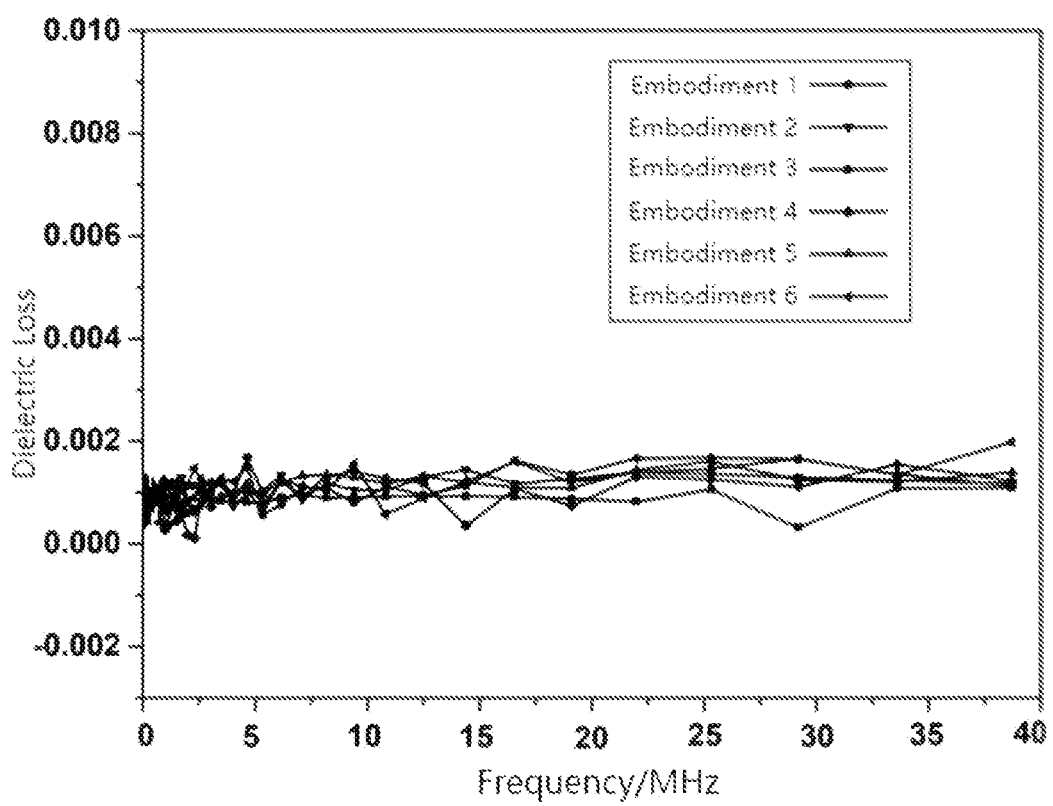
FIG. 2 shows a graph of dielectric loss of a glass powder sample versus tested frequency according to an embodiment of the present disclosure.
Figure 3:
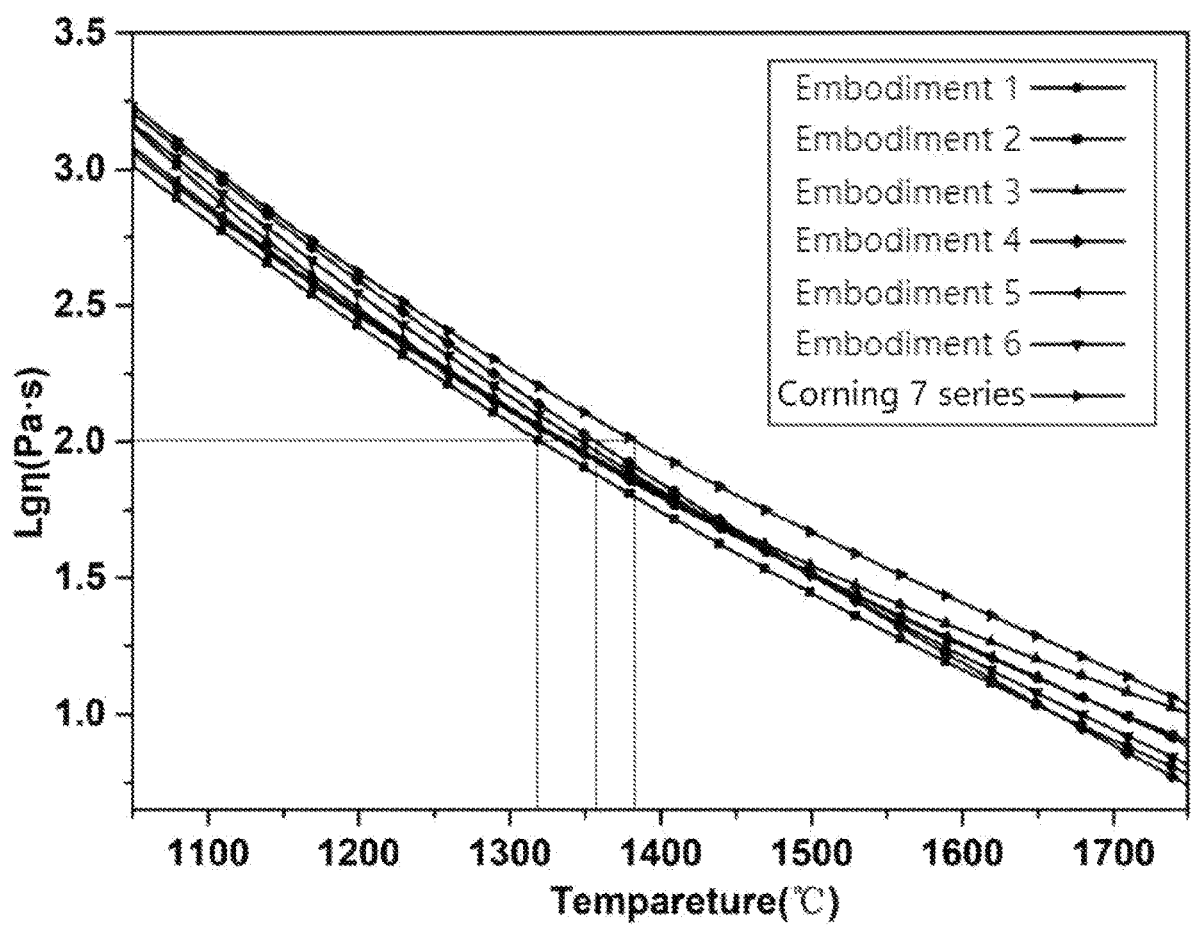
FIG. 3 shows a graph of high-temperature viscosity of a glass powder sample versus temperature according to an embodiment of the present disclosure.
Figure 4:
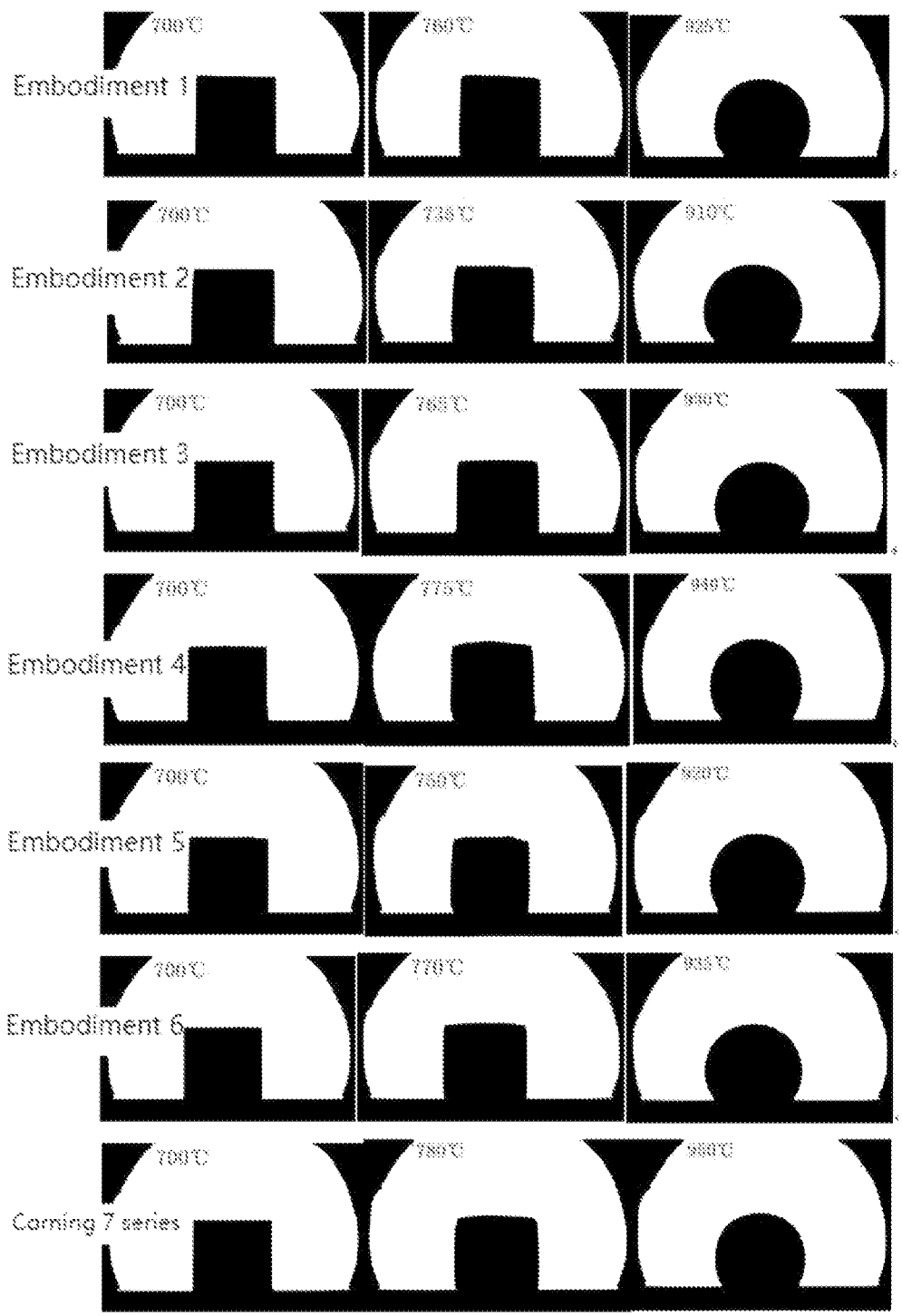
FIG. 4 shows a sintering image of a glass powder sample according to an embodiment of the present disclosure.

The present disclosure will be described in detail below in conjunction with specific examples, but the following examples are used to illustrate the present disclosure, and are not intended to limit the implementation scope of the present disclosure.

Embodiment (1) Preparation of a mixture of raw materials: the above-mentioned raw materials were weighed by mass parts, and then were fully mixed in a mixer for 2 hours to prepare the mixture of raw materials.

(2) Melting: a crucible was installed in an electric furnace, the heating temperature was raised to a predetermined melting temperature of 1550° C. according to a step temperature program, add the mixture of raw materials was added to the crucible, and kept at 1550° C. for 180 minutes to obtain a clarified glass liquid.

(3) A small part of the molten glass liquid was poured into a copper plate mould for molding and then preparing samples for related performance tests. The rest glass liquid was drying after quenching in deionized cold water.

(4) The obtained dried glass was put into a ball mill, and then was milled for 12 hours, afterward was screened through a 300-mesh sieve, so as to obtain the low dielectric sealing glass powder for the miniature radio-frequency glass insulator of the present disclosure.

(5) The dielectric constant, dielectric loss, melting and molding temperature, and sealing temperature were characterized by a precision impedance analyzer, a glass high-temperature viscometer, and a sintering imager respectively. The sealing temperature is represented by a hemispherical temperature of the cylindrical glass powder sample in the sintering imager. A corner passivation temperature is the temperature when the corners of the cylindrical sample begin to show smooth arcs after being heated, and is the lower limit temperature used for sealing the glass powder. The hemispherical temperature is the temperature at which the height of the cylindrical glass sample decreases, the bottom of the cylindrical glass sample expands, and the sample gradually assumes a hemispherical shape and exists stably. And the hemispherical temperature is the upper limit temperature for sealing the glass powder.

TABLE 1

| Component | Embodiment 1 | Embodiment 2 | Embodiment 3 | Embodiment 4 | Embodiment 5 | Embodiment 6 | Corning 7 series |
|---|---|---|---|---|---|---|---|
| SiO$_2$ | 71.0 | 71.5 | 72.0 | 72.0 | 73.0 | 73.5 | 74.7 |
| B$_2$O$_3$ | 23.0 | 22.0 | 22.5 | 21.5 | 21.0 | 21.0 | 23.6 |
| P$_2$O$_5$ | 1.0 | 1.0 | 1.0 | 1.0 | 1.5 | 1.5 | — |
| Ga$_2$O$_3$ | 1.0 | 1.0 | 1.0 | 1.0 | 1.0 | 1.0 | — |
| Li$_2$O | 2.0 | 2.5 | 2 | 1.5 | 1.5 | 1.05 | 1.03 |
| K$_2$O | 1.0 | 0.5 | 0.8 | 1.0 | 1.0 | 1.0 | 0.67 |

TABLE 1-continued

| Component | Embodiment 1 | Embodiment 2 | Embodiment 3 | Embodiment 4 | Embodiment 5 | Embodiment 6 | Corning 7 series |
|---|---|---|---|---|---|---|---|
| $LaB_6$ | 0.7 | 0.6 | 0.5 | 0.5 | 0.3 | 0.2 | — |
| NaCl | 0.15 | 0.15 | 0.2 | 0.2 | 0.25 | 0.25 | — |
| Dielectric Constant @1 MHz | 3.85 | 3.89 | 3.92 | 3.94 | 3.98 | 4.05 | 4.1 |
| Dielectric Loss $10^{-4}$ @1 MHz | 6.5 | 6.0 | 5.5 | 6.5 | 7.0 | 7.5 | 6.5 |
| Melting and Molding Temperature (° C.) | 1334 | 1322 | 1338 | 1356 | 1335 | 1347 | 1385 |
| Sealing Temperature (° C.) | 925 | 910 | 930 | 940 | 920 | 935 | 950 |

What is claimed is:

1. A low dielectric sealing glass powder for a miniature radio-frequency glass insulator, wherein the low dielectric sealing glass powder is made of raw materials expressed in molar percentages: $SiO_2$: 70.5-74.0%, $B_2O_3$: 20.5-23.5%, $Ga_2O_3$: 0.5-2.0%, $P_2O_5$: 0.25-2.0%, $Li_2O$: 0.4-6.0%, $K_2O$: 0.1-1.5%, $LaB_6$: 0.05-1.0%, and NaCl: 0.03-0.3%.

2. The low dielectric sealing glass powder for the miniature radio-frequency glass insulator according to claim 1, wherein the low dielectric sealing glass powder is made of raw materials expressed in molar percentages: $SiO_2$: 71.5-73.0%, $B_2O_3$: 21.5-23%, $Ga_2O_3$: 0.8-1.5%, $P_2O_5$: 0.5-1.5%, $Li_2O$: 0.8-5.5%, $K_2O$: 0.3-1.2%, $LaB_6$: 0.1-0.8%, and NaCl: 0.1-0.25%.

3. The low dielectric sealing glass powder for the miniature radio-frequency glass insulator according to claim 1, wherein the low dielectric sealing glass powder is made of raw materials expressed in molar percentages: $SiO_2$: 71.5-72.5%, $B_2O_3$: 22-23%, $Ga_2O_3$: 1-1.2%, $P_2O_5$: 0.8-1.2%, $Li_2O$: 1.5-2.5%, $K_2O$: 0.5-1.0%, $LaB_6$: 0.2-0.7%, and NaCl: 0.15-0.2%.

4. The low dielectric sealing glass powder for the miniature radio-frequency glass insulator according to claim 1, wherein a ratio of $Li_2O$ to $K_2O$ ranges from 1 to 6.

5. The low dielectric sealing glass powder for the miniature radio-frequency glass insulator according to claim 1, wherein a ratio of $Li_2O$ to $K_2O$ ranges from 1 to 3.

6. The low dielectric sealing glass powder for the miniature radio-frequency glass insulator according to claim 1, wherein a melting and molding temperature of the low dielectric sealing glass powder ranges from 1320° C. to 1360° C., and an obtained glass after melting has a dielectric constant ranging from 3.8 to 4.1 and a dielectric loss ranging from $4 \times 10^{-4}$ to $10 \times 10^{-4}$ at a frequency of 1 MHz, and a sealing temperature ranging from 900° C. to 950° C.

7. The low dielectric sealing glass powder for the miniature radio-frequency glass insulator according to claim 2, wherein a ratio of $Li_2O$ to $K_2O$ ranges from 1 to 3.

8. The low dielectric sealing glass powder for the miniature radio-frequency glass insulator according to claim 3, wherein a ratio of $Li_2O$ to $K_2O$ ranges from 1 to 3.

9. The low dielectric sealing glass powder for the miniature radio-frequency glass insulator according to claim 4, wherein a ratio of $Li_2O$ to $K_2O$ ranges from 1 to 3.

10. The low dielectric sealing glass powder for the miniature radio-frequency glass insulator according to claim 2, wherein a melting and molding temperature of the low dielectric sealing glass powder ranges from 1320° C. to 1360° C., and an obtained glass after melting has a dielectric constant ranging from 3.8 to 4.1 and a dielectric loss ranging from $4 \times 10^{-4}$ to $10 \times 10^{-4}$ at a frequency of 1 MHz, and a sealing temperature ranging from 900° C. to 950° C.

11. The low dielectric sealing glass powder for the miniature radio-frequency glass insulator according to claim 3, wherein a melting and molding temperature of the low dielectric sealing glass powder ranges from 1320° C. to 1360° C., and an obtained glass after melting has a dielectric constant ranging from 3.8 to 4.1 and a dielectric loss ranging from $4 \times 10^{-4}$ to $10 \times 10^{-4}$ at a frequency of 1 MHz, and a sealing temperature ranging from 900° C. to 950° C.

12. The low dielectric sealing glass powder for the miniature radio-frequency glass insulator according to claim 4, wherein a melting and molding temperature of the low dielectric sealing glass powder ranges from 1320° C. to 1360° C., and an obtained glass after melting has a dielectric constant ranging from 3.8 to 4.1 and a dielectric loss ranging from $4 \times 10^{-4}$ to $10 \times 10^{-4}$ at a frequency of 1 MHz, and a sealing temperature ranging from 900° C. to 950° C.

* * * * *